United States Patent [19]

McClelland et al.

[11] Patent Number: 5,289,311
[45] Date of Patent: Feb. 22, 1994

[54] OPTICAL ELEMENT SUCH AS A REAR PROJECTION SCREEN FOR AN IMAGE DISPLAY DEVICE AND METHOD OF PRODUCING SAME

[75] Inventors: Sandra K. McClelland, Langhorne; Randall E. McCoy, McConnellsburg, both of Pa.; Dominic S. Rosati, Jr., Trenton, N.J.

[73] Assignee: RCA Thomson Licensing Corp., Princeton, N.J.

[21] Appl. No.: 929,221

[22] Filed: Aug. 14, 1992

[51] Int. Cl.[5] .................................. G03B 21/56
[52] U.S. Cl. ............................ 359/457; 359/460
[58] Field of Search ............ 359/448, 454, 455, 456, 359/457, 460

[56] References Cited

U.S. PATENT DOCUMENTS

| | | | |
|---|---|---|---|
| 4,414,316 | 11/1983 | Conley | 430/496 |
| 4,420,527 | 12/1983 | Conley | 428/172 |
| 4,576,850 | 3/1986 | Martens | 428/156 |
| 4,656,522 | 4/1987 | Piascinski et al. | 358/247 |
| 5,066,099 | 11/1991 | Yoshida et al. | 359/457 |
| 5,100,222 | 3/1992 | Minoura et al. | 359/455 |

*Primary Examiner*—Richard A. Wintercorn
*Attorney, Agent, or Firm*—Joseph S. Tripoli; Dennis H. Irlbeck; Vincent J. Coughlin, Jr.

[57] ABSTRACT

An optical element such as a rear projection screen for an image display device comprises at least two substantially rigid sheet members each having a first major surface and a second major surface providing a plane of incidence and a plane of emergence, respectively, through which light is transmitted sequentially. A first sheet member comprises a Fresnel lens, and a second sheet member comprises a lenticular lens array on each of the major surfaces thereof. The plane of emergence on the second major surface of the first sheet member includes the Fresnel lens formed of a radiation curable material. A method of making the Fresnel lens is described.

2 Claims, 2 Drawing Sheets

OPTICAL ELEMENT SUCH AS A REAR PROJECTION SCREEN FOR AN IMAGE DISPLAY DEVICE AND METHOD OF PRODUCING SAME

This invention relates to an optical element, such as a rear projection screen for an image display device, and a method of producing such an element and, more particularly, to a screen having a Fresnel lens made of a UV curable resin which has less shrinkage and improved adhesion to a support member than prior thermoplastic materials or UV curable resins applied to films which are then attached to a support member.

BACKGROUND OF THE INVENTION

U.S. Pat. No. 4,414,316, issued to K. E. Conley on Nov. 8, 1983, describes several prior methods of making relief patterned sheets for such applications as relatively thin, flexible Fresnel lenses and for projection screens. One such method includes stamping or embossing by a platen press. This method involves placing a thermoplastic material in a platen press having an engraved surface corresponding to the desired relief pattern. The platen press is closed and subjected to a heating cycle, to heat and soften the thermoplastic material and cause it to conform to the engraved surface of the platen press. The platen press then undergoes a cooling cycle to cool and harden the thermoplastic material, so that it will retain its shape and can be removed from the press. Because of the required heating and cooling cycles, the platen press method is slow and relatively expensive. Also, the platen press has a tendency to entrap bubbles. Other methods are more suited to producing relief patterns in continuous length form. Typically, such continuous methods utilize an engraved roll, and the relief pattern is formed by the roll embossing the thermoplastic material while in a softened or molten state. However, such a process cannot be used to manufacture a Fresnel lens, since such a lens has a sawtooth structure that would interlock with the pattern on the roll. Because of the elastic nature of the thermoplastic material and the internal stresses imparted by the embossing roll, the embossed sheet produced by this method has a tendency to return to its original flattened and unstressed configuration. Therefore, the particular lens-like or other configurations which are formed in the sheet change in shape from their originally desired shapes, thus losing some of their desired optical qualities. Also, sheets produced by this method are highly susceptible to streaking during the manufacturing operation, as a result of condensation on the sheet during cooling. Additionally, the sheet is susceptible to dimensional distortion by the embossing machinery unless the roll speed and web tension are accurately maintained.

These problems are overcome by the use of thermosetting polymers, rather than thermoplastics. Cured thermosetting polymers are not subject to distortion or change in dimension with heat or moisture content, nor do they exhibit a tendency to change shape resulting from elastic memory imparted in producing the relief pattern. The preferred thermosetting materials are those that can be cured by actinic radiation, such as UV or electron beam radiation, in addition to heat curing. The above-referenced U.S. Pat. No. 4,414,316 discloses a method of making a composite sheet comprising a base film which is coated with a flowable uncured thermosetting resin with a molding surface having the desired lenticular pattern formed therein. To enhance the adhesion between the base film and the thermosetting resin layer, a primer or adhesion promoter preferably is applied to the front surface of the film, before the application of the resin. The resin is then cured, either thermally or by actinic radiation, to cause it to harden. The relief patterned thermosetting polymer layer is adherently and permanently bonded to the base film. The composite sheet material is utilized either in this form or it may have additional coating layers or laminations applied thereto. The thickness of the composite sheet ranges from about 0.15 to 0.76 mm. For other end use applications, the composite sheet material may be used as an intermediate product in producing sheet materials with predetermined relief patterns formed in both surfaces thereof. For such applications, the relief patterned thermosetting polymer layer is bonded to the base film with a relatively weak bond strength which permits stripping of the base film from the thermosetting polymer layer for further subsequent processing of the thermosetting polymer layer. However, the resultant structure is described as relatively thin and flexible, and therefore not suitable for use in a projection screen, without bonding the composite sheet to a suitable backing plate.

U.S Pat. No. 5,066,099, issued to T. on Nov. 19, 1991, describes a rear projection screen and a method of producing the same. In the patented structure, a UV curable material is flow coated onto the lenticular emergence surface of the screen, to form a light diffuser having a higher hardness than that of the underlying sheet material. There is no suggestion in the patent that UV curable materials can be patterned to make any of the lens components of the screen.

A need thus exists for a simple structure and method wherein UV curable materials may be used to form lens elements on substantially rigid transparent materials, without lamination or the use of additional primers or adhesion promoters.

SUMMARY OF THE INVENTION

An optical element according to the present invention comprises a substantially rigid sheet member having oppositely disposed major surfaces with a lens being formed of a radiation curable material on one of the major surfaces thereof.

DESCRIPTION OF THE PREFERRED EMBODIMENT

Figure 1:
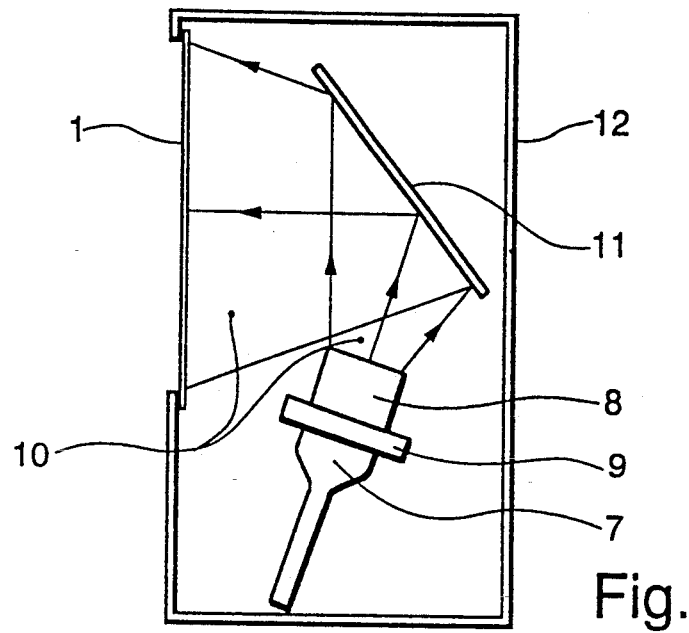
FIG. 1 shows a sectional view of a rear projection image display device employing the present invention.

FIG. 1 shows a sectional view of a rear projection image display device which includes a rear projection screen 1, a projection-type CRT 7 as a video source, a projection lens 8, a coupler 9 for coupling the CRT 7 to the lens 8, a projection luminous flux, or light, 10, a reflecting mirror 11 for reflecting the light 10, and a housing 12.

Figure 2:
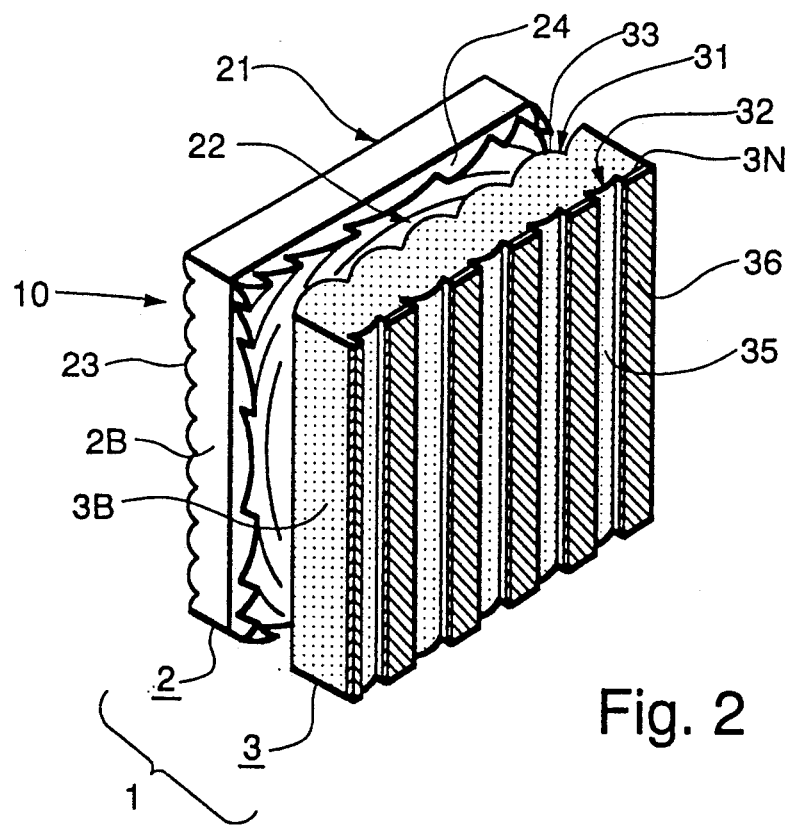
FIG. 2 is a perspective view of a novel rear projection screen according to the present invention.

A perspective view of the rear projection screen 1 is shown in FIG. 2. The screen 1 comprises a first substantially rigid, transparent sheet member 2 and a second substantially rigid sheet member 3, which is substantially transparent but may include light diffusing material therein or, alternatively, on a surface thereof. The first and second sheet members 2 and 3 are attached to each other at end portions thereof (not shown). Each of the sheet members has a thickness of about 3.18 mm. The first sheet member 2 includes a first major surface 21 and an oppositely disposed second major surface 22 separated by a body 2B of material. The first major surface 21 provides a plane of incidence for the light 10 emitted from the tube 7. The second major surface 22 provides a plane of emergence for the light. A lenticular array 23 is provided on the first major surface 21. The lenticular lenses on the first major surface 21, of the first sheet member 2, have the function of enlarging the vertical viewing angle. A Fresnel lens 24 is provided by a novel method, described hereinafter, below on the plane of emergence of the second major surface 22 of the first sheet member 2. The Fresnel lens 24 converts the light image from the CRT 7 to form parallel rays which are then incident on the second sheet member 3.

The second sheet member 3 has a first major surface 31 and an oppositely disposed second major surface 32 separated by a body 3B of material. The first major surface 31 provides a plane of incidence for the parallel rays incident on the second sheet member 3. A lenticular array 33 is provided on the first major surface 31 in which the longitudinal direction of the lenticular lenses are arrayed vertically. The second major surface 32, which provides a plane of emergence for the second sheet member 3, is provided with an array of lenticular lenses 35 similar to and aligned along the direction of the lenses 33 on the first major surface 31. The lenticular lenses on the first and second major surfaces 31 and 32, respectively, of the second sheet 3, are orthogonal to the lenticular lenses 23 formed on the plane of incidence on the first major surface 21 of the first sheet member 2. The lenticular lens arrays 33 and 35 on the second sheet 3 enlarge the horizontal viewing angle of the light which is transmitted sequentially throught the sheet members 2 and 3 of the rear projection image display device. Light non-transmitting areas 3N at the boundary portions of the lenticular lenses 35 have flat surfaces on which a light absorbing layer 36 is provided.

The bodies 2B and 3B of each of the first and second members are formed of a sheet of an acrylic or a polycarbonate thermoplastic resin. The lenticular arrays 33 and 35 on the first and second major surfaces 31 and 32 of the sheet member 3 are formed by a known method. For example, the sheet 3, in a heated state, is passed between a roll having a matrix for the geometry of the lenticular lens array 33 for the first major surface 31 and a roll having a matrix for the geometry of the lenticular array 35 for the second major surface 32. By this operation, the lenticular arrays are formed. Alternatively, the sheet 3 is heated and pressed by a platen press using plates provided with the matrices of the geometries of the lenticular lens arrays 33 and 35 for the first and second major surfaces 31 and 32, respectively. The sheet material 3 may contain suitable quantities of light diffusing materials therein or applied to one surface thereof, in the manner described in U.S. Pat. No. 5,066,099, referenced above.

The sheet member 2 also is formed of a thermoplastic material with the lenticular lens array 23 formed on the first major surface 21 thereof, for example, by one of the conventional means described above. However, the Fresnel lens 24 is not formed by conventional hot pressing processes, since such a process tends to discolor the lens and, on cooling, the Fresnel lens also tends to distort, or change in dimension, because of its elastic memory. The Fresnel lens 24 is made by the novel process described below.

Figure 3:
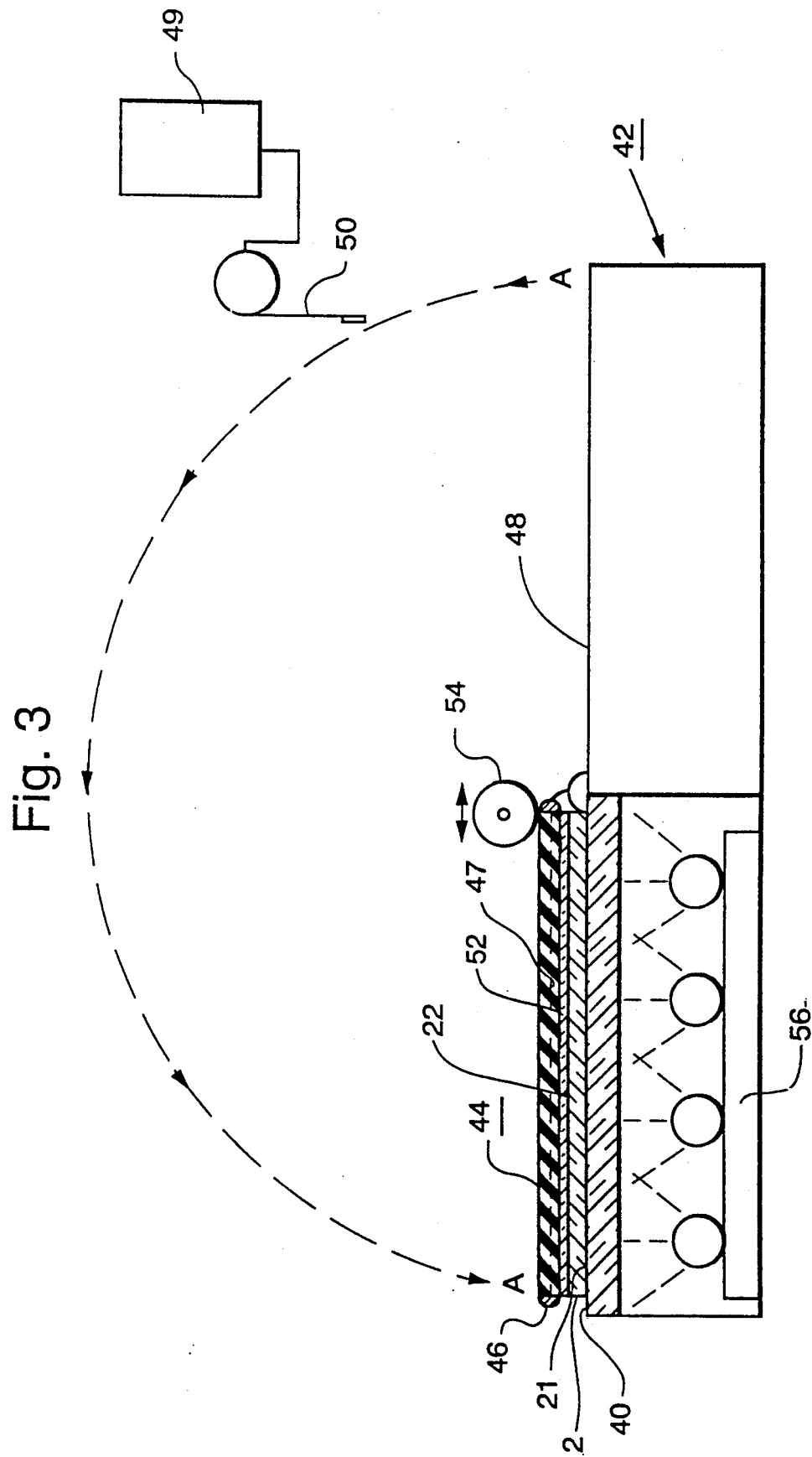
FIG. 3 is a plan view of an apparatus for making the novel projection screen.

To prepare the first sheet member 2 according to the invention, the sheet member, having the lenticular array 23 formed on the first surface 21, is disposed with the lenticular array 23 in contact with a support surface 40 of a forming device 42, as shown in FIG. 3. The support surface 40 is a flat transparent material, such as glass or plastic. A flexible mold 44, supported within a frame 46, and having a negative pattern (not shown) of a Fresnel lens provided in one surface 47 thereof, initially is disposed, patterned surface up, on a complimentary support surface 48 of the device 42. The flexible mold 44 is cast from a permanent master mold (also not shown) having the Fresnel lens pattern formed therein. A quantity of a suitable optically transparent UV curing acrylic material comprising a premixed resin and catalyst, such as Three Bond 3001, available from Three Bond of America, West Chester, Ohio; Norland UV materials, available from Norland Products Inc., New Brunswick, N.J.; Hercules UV material, available from Hercules Inc., Wilmington, Del.; or Lord Photoglaze UV material available from Lord Corp., Erie, Pa., is degassed and dispensed from a container 49, through a hose 50, onto the patterned surface 47 of the flexible mold 44. Preferably, a line of the UV material is formed along one edge of the mold 44 and uniformly spread over the patterned surface 47 to fill the Fresnel lens pattern depressions, to form an uncured coating 52. Then, the mold frame 46 is swung in an arc A-A, so that the flexible mold 44 is inverted with the uncured coating 52 of UV material in proximity to the plane of emergence on the second major surface 22 of the sheet 2. A roller 54 is used to uniformly smooth the flexible mold and its coating 52 onto the second major surface 22 of the sheet 2. Next, the coating 52 is cured, by exposing it to actinic radiation in the form of UV light from light source 56 located below the transparent support surface 40. Preferably, the UV light is pulsed, to avoid heating the UV coating 52 and thus prevent the formation of bubbles which would cause defects in the Fresnel lens. As the coating cures, it forms the Fresnel lens 24 directly on the plane of emergence of the second major surface 22 of the first sheet member 2. Since the Fresnel lens 24 is integral with the second major surface 22, and no primer or adhesive is required to secure the lens 24 thereto, there is no additional light attenuating layer in the projection screen made according to this invention, and, therefore, no reduction in brightness of the transmitted light. Additionally, since the Fresnel lens 24 is formed by UV curing, rather than thermal curing, there is no distortion, shrinkage, discoloration or elastic memory relaxation of the resultant lens. Thus providing greater accuracy in the transmission of the light from the video source 7. After the coating 52 is cured, the flexible mold is peeled from the second sheet member 2 to uniformly release the mold without distorting the Fresnel lens 24. Finally, the sheet member 2 is removed from the support surface 40 of the forming device 42. The first sheet member 2 and the second sheet member 3 are assembled in spaced relation, as shown in FIG. 2, to form the rear projection screen 1.

While specific UV curing materials are described herein, other UV curable polymers, dimers and cyanoacrylate materials may be used.

What is claimed is:

1. In a rear projection screen for an image display device comprising at least two substantially rigid sheet members each having a first major surface and a second major surface through which light is transmitted sequentially, wherein a first sheet member comprises a Fresnel lens and a second sheet member comprises a lenticular lens array on each of said major surfaces thereof, the improvement wherein said second major surface of said first sheet member includes said Fresnel lens being formed of a radiation curable material.

2. The image display device as described in claim 1, wherein said first major surface of said first sheet having a geometry of a lenticular lens array, the array direction being orthogonal to the array direction of the lenticular lens arrays on said second sheet.

* * * * *

UNITED STATES PATENT AND TRADEMARK OFFICE
CERTIFICATE OF CORRECTION

PATENT NO. : 5,289,311
DATED : February 22, 1994
INVENTOR(S) : Sandra K. McClelland, Randall E. McCoy, and Dominic S. Rosati It is certified that error appears in the above-identified patent and that said Letters Patent is hereby corrected as shown below:

Column 1, line 58, after "content"
change " ," to--;--;

Column 2, line 25, after "T." add
--Yoshita et al.--;

Column 3, line 15, delete "hereinafter,"
and add --,--after "below";

Column 4, line 50, after "invention"
change " , " to--;--;

Column 4, line 51, before "no" add
--there is--.

Signed and Sealed this

Twenty-eighth Day of June, 1994

Attest:

BRUCE LEHMAN

*Attesting Officer*  *Commissioner of Patents and Trademarks*